Feb. 19, 1957 J. E. BACLAWSKI 2,782,330
COMMUTATOR CONSTRUCTION AND METHOD OF MAKING THE SAME
Filed Oct. 31, 1955
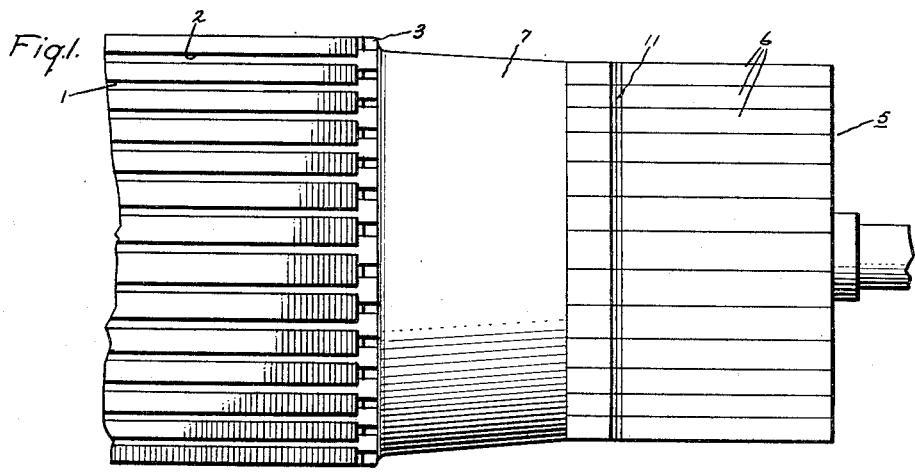
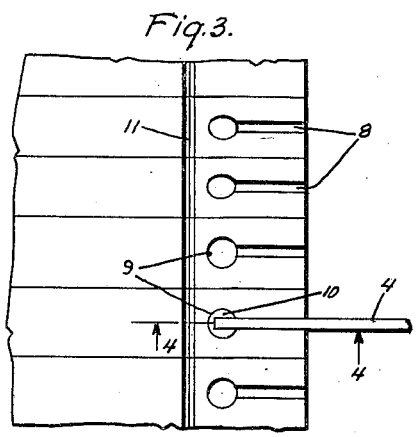
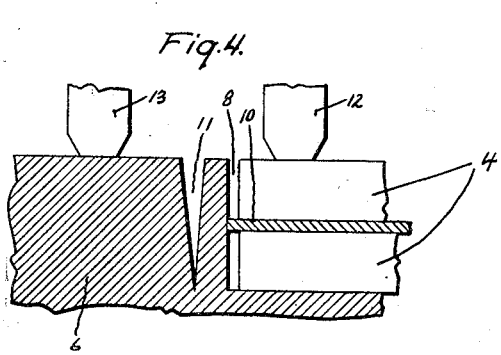
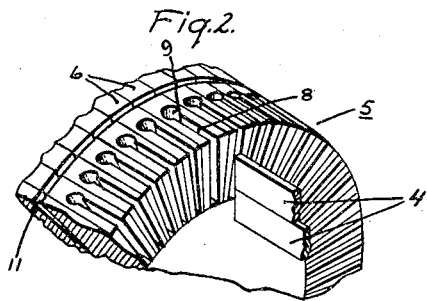
Inventor:
Joseph E. Baclawski,
by *Robert G. Irish*
His Attorney.

United States Patent Office 2,782,330
Patented Feb. 19, 1957

2,782,330

COMMUTATOR CONSTRUCTION AND METHOD OF MAKING THE SAME

Joseph E. Baclawski, Fort Wayne, Ind., assignor to General Electric Company, a corporation of New York Application October 31, 1955, Serial No. 543,716

5 Claims. (Cl. 310—234)

This invention relates to commutator-type dynamoelectric machines, and more particularly to an improved commutator construction for such machines and a method of achieving the improved construction.

There are many applications, particularly in the field of aviation, where a great deal of power must be provided intermittently by commutator-type dynamoelectric machines of comparatively small size. Such machines generally have high current density in the brush, and a major difficulty that has been encountered in their manufacture results from the fact that the commutators of such machines frequently do not provide adequate surface for the brushes, resulting in excessive current densities and destructive commutation. This lack of adequate surface results partly from the fact that the commutator is usually machined down over the brush contacting part of its surface to provide a riser at the end of each bar to which are connected the armature leads. Since it generally is desirable that the riser be no larger in diameter than the armature, the result is that the remainder of the commutator which is actually in contact with the brush must be considerably smaller thereby decreasing the area which may be effectively in contact with the brush. Another difficulty brought about by the presence of the risers lies in the fact that a safe clearance must be provided between the risers and the means provided to hold the brushes on the commutator so that an additional amount of commutator length is lost for effective usage. Yet another loss of area for brush contact arises from the presence of the risers themselves since the thickness of the risers immediately becomes a complete loss insofar as brush contact area is concerned.

Another undesirable result of the relatively small commutator diameter caused by the presence of the risers comes from the fact that the commutator often is the limiting factor insofar as heating of the motor is concerned. As the size of the commutator is decreased, the rapidity with which it reaches an excessive temperature increases. For this reason, it is again desirable to increase the diameter of the commutator in order to provide a larger volume of material for heat absorption during operating of the machine.

An economic and effective method of carrying the high current required is known to lie in the use of rectangular or bar conductors for the armature coils; with at least two lead ends being connected to each commutator bar in the normal manner.

It has been discovered that the use of such rectangular conductors in dynamoelectric machines, in combination with the particular commutator construction to be set forth hereafter, permits the elimination of risers at the end of the commutator bars and the effective use of each entire commutator bar in a commutator having an increased effective diameter.

Accordingly, it is an object of this invention to provide an improved commutator construction which will incorporate the desirable features set forth above.

Another object of the invention is to provide an improved method of making a commutator.

Further objects and advantages of this invention will become apparent and the invention will be better understood by reference to the following description and the accompanying drawing, and the features of novelty which characterize this invention will be pointed out with particularity in the claims annexed to and forming a part of this specification.

In one of its broader aspects, this invention provides, in combination, a commutator bar with a recess formed at one end and a pair of rectangular leads having their ends superposed in the recess. The bar has a slot of a depth substantially equal to that of the superposed lead ends which extends substantially across the bar adjacent the end of the recess. The lead ends are integrally joined to the bar in the recess so that a strong bond of the leads to the bar is secured by a material liquefied into substantial homogeneity with the leads and bar, and the entire outer surface of the bar may thus be used for brush contact.

In the drawing, Figure 1 is a fragmentary side view of an armature member of a dynamoelectric machine having the improved commutator connection construction of this invention.

Figure 2 is a fragmentary view in perspective of a commutator during construction thereof;

Figure 3 is a fragmentary plan view of the end of the improved commutator of this invention during construction thereof; and Figure 4 is a view along line 4—4 in Figure 3 and shows the final stage of construction of the improved commutator.

Referring now to the figures of the drawing, there is shown a part of a direct current motor armature 1, which may, as shown, be formed from a stacked plurality of thin laminations of magnetic material. Armature 1 is provided with slots 2 in which are positioned the armature coils 3 formed from bars of substantially rectangular cross section, preferably having a composition including a substantial amount of copper. A commutator 5 is provided, and the ends of at least two of the leads 4 are connected to each axially extending commutator bar 6, also preferably composed of a material including a substantial amount of copper, as will be set forth below. The customary insulation 7 may be provided over that part of the bars which extends from armature winding to commutator 5, as is well known in the art. Each bar 6 is flat along the entire length thereof, without any riser at the end as is customary and is, of course, suitably insulated from the adjacent bars in the usual manner. The bar presents a smooth substantially homogeneous surface along the entire length of its outer surface so that it can be used for brush track. In addition, the absence of a riser permits the entire commutator to have the largest diameter possible thereby further increasing the area of the brush track and increasing the volume of the material forming the commutator so as to provide increased heat absorption.

In order to provide the above construction, the bar leads 4 are secured to the commutator bars 6 in the manner now to be described. A slot-like recess 8 is formed in the end of each commutator bar 6 extending from the surface of the bar to a depth substantially equal at least to the height of the superposed conductors 4 (best seen in Figures 2 and 4). A preferred construction includes an enlarged portion at the inner end of each recess; such a construction may be simply achieved, for instance, by drilling portion 9 of the recess from above the commutator bar 6 and then cutting through to portion 9 with recess 8 from the end of each bar 6. However, it will be understood that many other methods of providing the necessary recess 8 are available and that use of any particular method of providing the recess does not constitute a departure from this invention.

A pair of superposed conductors 4 are then arranged in each recess 8. It will, of course, be understood that where more than one coil is positioned in each armature slot 2, the number of superposed conductors 4 to be arranged within each recess 8 will increase, and that such deviations from the embodiment shown do not constitute a departure from the invention.

A quantity of brazing compound, shown at 10, is introduced into recess 8 at any appropriate time, either before, during or after the introduction of leads 4, or, if so desired, partly before and during, and partly after. The brazing compound preferably includes a substantial amount of copper. Such compounds are commercially available; one, for instance, includes silver, copper, and phosphorus, and, upon heating, liquefies to release the phosphorus and subsequently hardens.

Each commutator bar 6 has a slot 11 formed therein adjacent the end 9 of recess 8. As seen in Figure 4, this slot is provided with a depth substantially equal to that of the superposed leads 4 in recess 8. Generally, this may be achieved by making slot 11 equal in depth to recess 8 since the superposed leads extend the full depth thereof. To secure the leads 4 within recess 8, they are then brazed into place. This involves the use of a pair of electrodes 12 and 13 which are respectively placed on the top lead 4 in recess 8 and on the commutator bar 6 on the other side of slot 11. A high current, generally on the order of two thousand or three thousand amperes, is then caused to flow between the electrodes. This causes sufficient heating to melt the brazing compound 10 and cause it to fill up the recess 8 and secure the leads 4 therein. Since the leads and the commutator bar 6 both include a substantial amount of copper and the brazing compound is a copper alloy, the brazing operation causes the leads 4, the bar 6 and the material 10 within recess 8 to become substantially homogeneous. In fact, experimentation has shown that it is very difficult after the operation has been completed to perceive that the bar 6 is not in its original uncut condition. Such a provision is desirable since any substantial difference in composition would result in different rates of wear thereby precluding commutation over the full length of each bar. To cause the current to flow through all the leads 4, as is necessary if a properly brazed joint is to be effected, the current must be prevented from passing along bar 6 near the surface thereof. For this reason, slot 11 performs an important function in that it forces the current to travel around the bottom of the slot and thereby through all the leads 4 between electrodes 12 and 13.

Once this operation has been performed, the commutator bars 6 will then appear substantially as shown in Figure 1, that is, without any break in their surface except for the relatively small continuous one caused by slot 11. The nature of the brazing operation causes the material filling recess 8 to be substantially homogeneous with the rest of the commutator bar and suitable for machining (by diamond turning for instance) with the rest of the bar so as to provide a brush track. This means that the brush track may be provided from one end of each bar to the other without any lose of space whatsoever except for the narrow slot 11 which is necessary for the brazing operation to be a success. The construction also permits the elimination of the machining operation to grind down the commutator to form a riser and thus permits the increased diameter of the commutator with the desirable effects discussed hereabove.

Thus, it will be seen that this invention provides a construction whereby increased brush track area is provided on the commutator so as to make higher operating currents and voltages feasible and an increased volume of the commutator is possible so as to make possible longer operation of the motor without overheating the commutator. In addition, an economical and novel method of obtaining such structure has also been set forth whereby no additional expense over that normally required in construction of this type is met.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In combination, a commutator bar having a recess formed at one end thereof, and a pair of rectangular leads having their ends superposed in said recess, said bar having a slot of a depth substantially equal to that of said superposed lead ends extending substantially across said bar adjacent the end of said recess, said lead ends being brazed in said recess.

2. A cylindrical commutator comprising a plurality of axially extending bars of conductive material insulated from each other, each of said bars having its outer surface formed as a smooth brush-receiving track, each bar having a recess formed at one end thereof extending downwardly from the other surface, and a plurality of rectangular leads formed into groups of at least two, the leads of each said group having their ends superposed in said recesses respectively, each of said commutator bars having a slot of a depth substantially equal to that of said recess extending substantially across said bar adjacent the end of said recess, and a quantity of brazing compound in each said recess formed into substantial homogeneity with said leads and said bar.

3. A method of securing a plurality of rectangular leads to a commutator bar comprising forming a recess at one end of said bar extending inwardly from the outer surface thereof, superposing the ends of said leads in said recess, forming a slot across the outer surface of said bar adjacent the end of said recess to a depth substantially equal to that of said leads, placing a predetermined amount of brazing compound in said recess, and passing an electric current between the top lead in said recess and said commutator bar on the other side of said slot to liquefy said compound and cause it to become substantially homogeneous with said bar and said leads.

4. A method of securing a plurality of rectangular leads formed of a material containing a substantial amount of copper to a commutator bar formed of a material also containing substantial amount of copper comprising forming a recess at one end of said bar extending inwardly from the outer surface thereof, forming a slot across the outer surface of said bar adjacent the end of said recess to a depth substantially equal to that of said recess, superposing the ends of said pair of leads in said recess, placing a predetermined amount of a brazing compound containing a substantial amount of copper in said recess, and passing an electric current between the top lead in said recess and said commutator bar on the other side of said slot to liquefy said compound and to cause it to become substantially homogeneous with said bar and said leads.

5. A cylindrical commutator comprising a plurality of axially extending bars formed of a material including a substantial amount of copper insulated from each other, each of said bars having its outer surface formed as a smooth brush-receiving track, each bar having a recess formed at one end thereof extending downwardly from the outer surface, a plurality of pairs of rectangular leads formed of material containing a substantial proportion of copper respectively having their ends superposed in said recesses, each said bar having a slot of a depth substantially equal to that of said superposed lead ends extending substantially across said bar adjacent the end of said recess, and a quantity of material including a substantial proportion of copper in each said recess formed into substantial homogeneity with said bar and said leads.

References Cited in the file of this patent

UNITED STATES PATENTS

| | | |
|---|---|---|
| 815,985 | Strauss | Mar. 27, 1906 |
| 1,142,241 | Ellinger | June 8, 1915 |
| 2,446,708 | Levin | Aug. 10, 1948 |
| 2,455,560 | Cobb | Dec. 7, 1948 |

FOREIGN PATENTS

| | | |
|---|---|---|
| 709,207 | Great Britain | May 19, 1954 |